US012576943B2

(12) United States Patent　　　(10) Patent No.:　US 12,576,943 B2
Sugawara et al.　　　　　　　　　(45) Date of Patent:　　Mar. 17, 2026

(54) FRONT FORK

(71) Applicants: KYB Motorcycle Suspension Co., Ltd., Gifu (JP); KYB Corporation, Tokyo (JP)

(72) Inventors: Hidetoshi Sugawara, Gifu (JP); Naoki Ito, Tokyo (JP); Takumi Hayashiguchi, Tokyo (JP); Hirokatsu Maeda, Gifu (JP)

(73) Assignees: KYB Motorcycle Suspension Co., Ltd., Gifu (JP); KYB Corporation, Tokyo (JP)

( * ) Notice: Subject to any disclaimer, the term of this patent is extended or adjusted under 35 U.S.C. 154(b) by 409 days.

(21) Appl. No.: 18/265,359

(22) PCT Filed: Dec. 10, 2021

(86) PCT No.: PCT/JP2021/045556

§ 371 (c)(1),
(2) Date: Jun. 5, 2023

(87) PCT Pub. No.: WO2022/172573

PCT Pub. Date: Aug. 18, 2022

(65) Prior Publication Data

US 2024/0034429 A1　　Feb. 1, 2024

(30) Foreign Application Priority Data

Feb. 15, 2021　(JP) .................................. 2021-021556

(51) Int. Cl.
　B62K 25/08　　　(2006.01)
　F16B 7/18　　　(2006.01)
　F16F 13/00　　　(2006.01)
(52) U.S. Cl.
　CPC ................ B62K 25/08 (2013.01); F16B 7/18 (2013.01); F16F 13/007 (2013.01);
　(Continued)

(58) Field of Classification Search
　CPC .......... B62K 25/08; F16B 7/18; F16F 13/007; F16F 2222/12; F16F 2228/066;
　(Continued)

(56) References Cited

U.S. PATENT DOCUMENTS 11,835,107 B2 * 12/2023 Barefoot ............. B62K 25/286
2010/0294605 A1 * 11/2010 Mochizuki ............ B62K 25/08
　　　　　　　　　　　　　　　　　188/297

(Continued)

FOREIGN PATENT DOCUMENTS

EP　　　　2538496 A1　12/2012
JP　　　S60-079034 U1　6/1985

(Continued)

OTHER PUBLICATIONS

Apr. 19, 2025, Chinese Office Action issued for related CN Application No. 202180088402.X.

(Continued)

*Primary Examiner* — Valentin Neacsu
*Assistant Examiner* — Marlon A Arce
(74) *Attorney, Agent, or Firm* — Paratus Law Group, PLLC

(57)　　　　　　ABSTRACT

A front fork according to the present invention includes: a fork main body including a vehicle body side tube and an axle side tube; a cap body attached to a vehicle body side tube; a cylinder provided in the axle side tube; a cylindrical rod axially movably inserted into the cylinder; an electric device housed in the cylinder; and a wire that is inserted into the rod, passes through the cap, and is drawn out from the fork main body and is connected to the electric device, in which the connection tube and the rod in the cap are connected by a connection nut that is rotatably mounted on an outer circumference of one of the connection tube and the (Continued)

rod and is restricted in movement in the axial direction toward the other, and screwed to the other.

6 Claims, 6 Drawing Sheets

(52) U.S. Cl.
CPC ..... *F16F 2222/12* (2013.01); *F16F 2228/066* (2013.01); *F16F 2230/007* (2013.01); *F16F 2230/18* (2013.01)

(58) Field of Classification Search
CPC .. F16F 2230/007; F16F 2230/18; F16F 9/469; F16F 9/463

See application file for complete search history.

(56) References Cited

U.S. PATENT DOCUMENTS

| | | | |
|---|---|---|---|
| 2015/0197307 | A1 | 7/2015 | Mochizuki et al. |
| 2016/0280315 | A1* | 9/2016 | Murakami ............ F16F 9/3292 |
| 2018/0281893 | A1* | 10/2018 | Awano ................... B62K 25/08 |
| 2020/0354013 | A1* | 11/2020 | Ericksen ............... F16F 9/5126 |
| 2021/0009230 | A1* | 1/2021 | Miyata ..................... F16F 9/34 |
| 2022/0242518 | A1 | 8/2022 | Shimauchi |

FOREIGN PATENT DOCUMENTS

| | | | |
|---|---|---|---|
| JP | H02-267093 | A | 10/1990 |
| JP | 2014-190405 | A | 10/2014 |
| WO | WO 2021/024777 | A1 | 2/2021 |

OTHER PUBLICATIONS

Jan. 18, 2022, Translation of International Search Report issued for related PCT Application No. PCT/JP2021/045556.

* cited by examiner

FRONT FORK

CROSS REFERENCE TO PRIOR APPLICATION

This application is a National Stage Patent Application of PCT International Patent Application No. PCT/JP2021/045556 (filed on Dec. 10, 2021) under 35 U.S.C. § 371, which claims priority to Japanese Patent Application No. 2021-021556 (filed on Feb. 15, 2021), which are all hereby incorporated by reference in their entirety.

TECHNICAL FIELD

The present invention relates to a front fork.

BACKGROUND ART

In the related art, as a front fork that supports a front steered wheel of a straddle vehicle, for example, a telescopic front fork is known, which includes: a fork main body including a vehicle body side tube and an axle side tube movably inserted into the vehicle body side tube; and a damper accommodated in the fork main body, and extending and contracting in accordance with extension and contraction of the fork main body.

The damper includes a cylinder, a piston that partitions an inside of the cylinder into an extension side chamber and a compression side chamber which are filled with a hydraulic liquid, and a piston rod that is inserted into the cylinder so as to be axially movable and is connected to the piston. In the damper, for example, the piston rod is connected to a cap that closes an upper end of the vehicle body side tube, and the cylinder is fixed to a lower end of the axle side tube and accommodated in the fork main body.

In such a front fork, damping force generated by the damper for improving riding comfort of the straddle vehicle can be adjusted by a controller installed outside the front fork. In the front fork capable of automatically adjusting the damping force, for example, electroviscous fluid or electromagnetic viscous fluid is used as the hydraulic liquid of the damper, and the damping force is changed by adjusting an amount of a current supplied to a coil accommodated in the piston to change viscosity of the hydraulic liquid. Furthermore, in another front fork capable of automatically adjusting the damping force, for example as disclosed in JP 2014-190405 A, a solenoid valve is accommodated in the piston and the damping force of the damper is adjusted by adjusting an amount of power supplied to the solenoid valve.

CITATION LIST

Patent Literature

Patent Literature 1: JP 2014-190405 A

SUMMARY OF INVENTION

Technical Problem

In the front fork capable of automatically adjusting the damping force as described above, an electric device such as a coil or a solenoid valve for adjusting the damping force is provided in the damper, and it is necessary to supply power from an external power supply or a controller to the electric device. Therefore, in the front fork of the related art, the piston rod is formed in a tubular shape, a through hole through which a wiring passes is provided in a cap, the wiring is lead out to the outside of the fork main body through the inside of the piston rod and the through hole of the cap while the wiring connected to the electric device is sealed, and the wiring is connected to the external power supply or the like.

However, in the conventional front fork, a threaded portion provided at an upper end of the piston rod is screwed to a threaded portion provided on an inner circumference of a cylindrical portion extending downward of the cap, and the piston rod is connected to the cap holding the wire. Therefore, when the cap and the piston rod are screwed together, it is absolutely necessary to rotate the cap with respect to the piston rod, and there is a problem of the wire being twisted.

Therefore, an object of the present invention is to provide a front fork capable of preventing twisting of a wire for supplying electric power to an internal electric device.

In order to achieve the above object, a front fork according to the means for solving the problem of the present invention includes: a telescopic fork main body having a vehicle body side tube and an axle side tube, the telescopic fork main body being expandable and contractible; a cap attached to a vehicle body side end of the vehicle body side tube; a cylinder provided in the axle side tube; a tubular rod that is axially movably inserted into the cylinder and has one end connected to a cap body; an electric device housed in the cylinder; and a wire that is connected to the electric device, is inserted into the rod, passes through the cap, and is drawn out from the fork main body, in which the cap includes a connection tube connected to the rod, and the connection tube and the rod are connected by an annular connection nut that is rotatably mounted on an outer circumference of one of the connection tube and the rod, and is restricted in movement in the axial direction toward the other, and screwed to an outer circumference of the other of the connection tube and the rod.

In the front fork thus configured, the connection nut is attached to the outer circumference of one of the connection tube and the rod so as to be rotatable in the circumferential direction although the movement of the connection nut to the other direction is restricted, whereby, as the connection nut is being screwed to the outer circumference of the other of the connection tube and the rod, the connection tube and the rod are pulled and coupled without being rotated by the connection nut. Therefore, in the front fork described above, when attaching and detaching the cap to and from the rod, only the connection nut needs to be rotated without rotating the cap and the rod in the circumferential direction.

DESCRIPTION OF EMBODIMENTS

Figure 1:
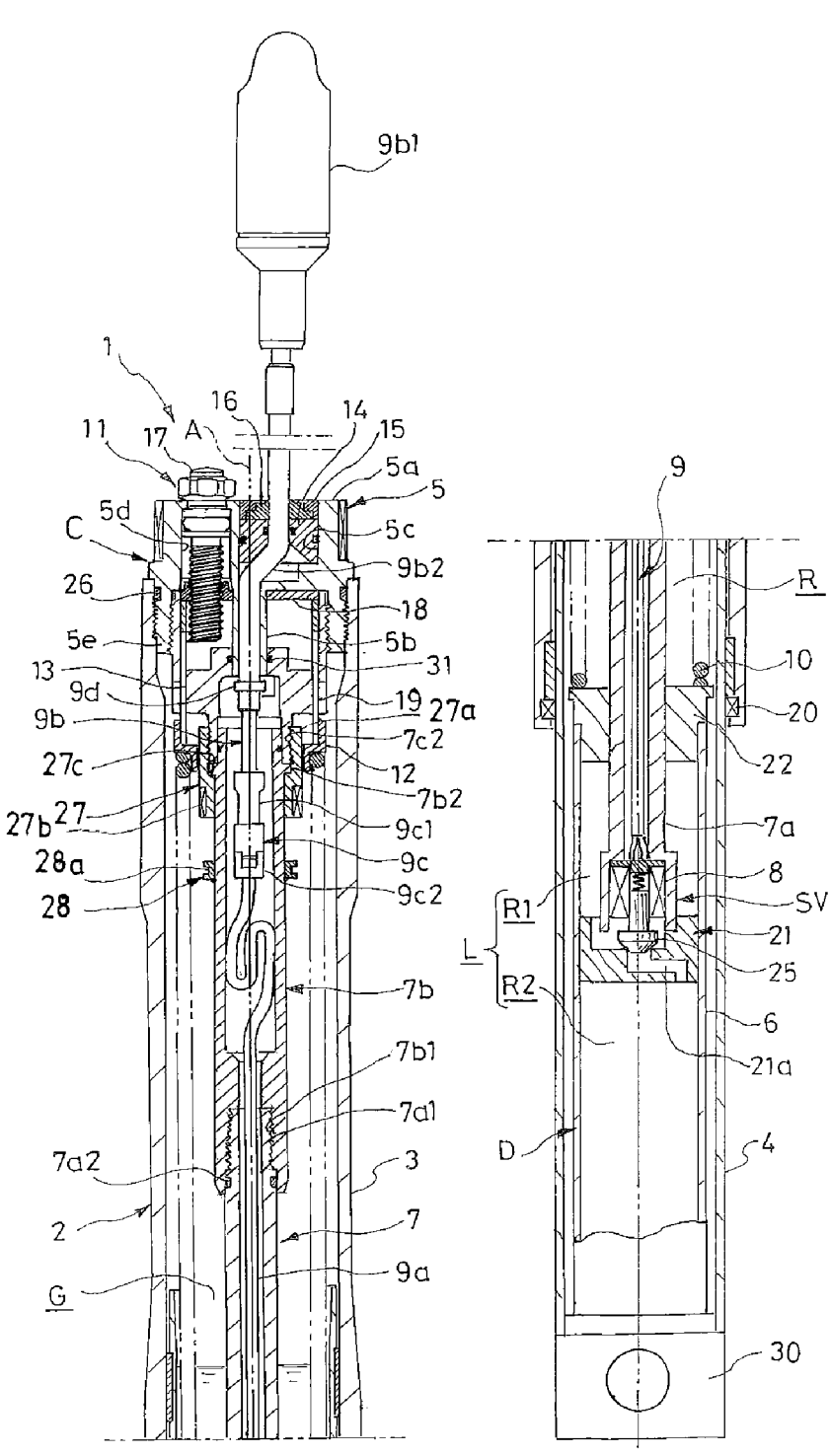
FIG. 1 is a longitudinal sectional view of a front fork according to an embodiment of the present invention.
Figure 2:
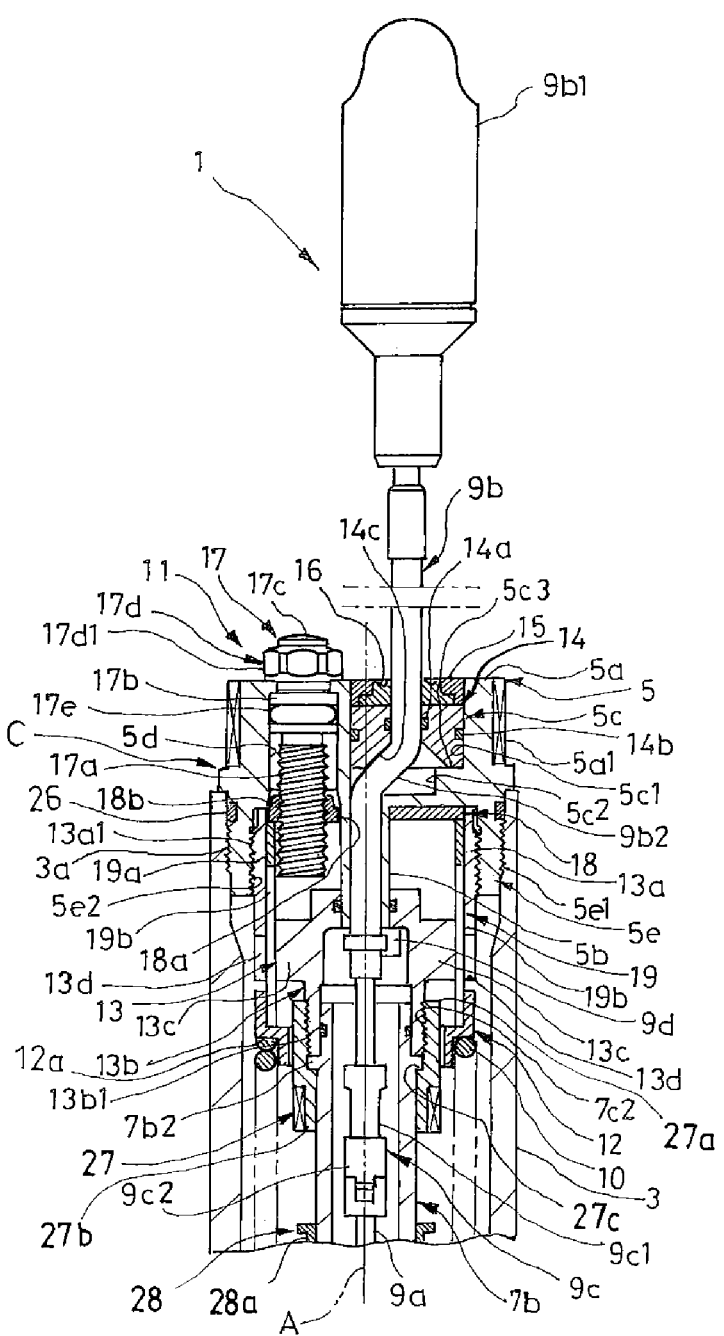
FIG. 2 is an enlarged longitudinal sectional view of an upper end portion of a front fork according to an embodiment of the present invention.

The present invention will now be explained based on the embodiment illustrated in drawings. As illustrated in FIGS. 1 and 2, a front fork 1 according to an embodiment includes: a telescopic fork main body 2 having a vehicle body side tube 3 and an axle side tube 4, the telescopic fork main body 2 being expandable and contractible; a cap C attached to a vehicle body side end of the vehicle body side tube 3; a cylinder 6 provided in the axle side tube 4; a piston rod 7 as the tubular rod that is axially movably inserted into the cylinder 6 and has one end connected to the cap C; a solenoid 8 as an electric device housed in the cylinder 6; a wire 9 that is connected to the solenoid 8, is inserted into the piston rod 7, passes through the cap C, and is drawn out from the fork main body 2; and a connection nut 27 that connects the cap C and the piston rod 7. In the front fork 1, the vehicle body side tube 3 is connected to a vehicle body of a straddle vehicle not illustrated, and the axle side tube 4 is connected to a front wheel of the straddle vehicle not illustrated and is used in the straddle vehicle, and the vehicle body side tube 3 and the axle side tube 4 are relatively displaced along an axial center line A of the fork main body 2 by vibration during travel of the straddle vehicle to expand and contract.

Hereinafter, each unit of the front fork 1 according to the embodiment will be described in detail. As illustrated in FIGS. 1 and 2, the front fork 1 includes the telescopic fork main body 2 including the vehicle body side tube 3 and the axle side tube 4 slidably inserted into the vehicle body side tube 3. When vibration acts on the fork main body 2, the axle side tube 4 enters and exits the vehicle body side tube 3, and the fork main body 2 extends and contracts. Note that in the present embodiment, the fork main body 2 is of an inverted type in which the axle side tube 4 is inserted into the vehicle body side tube 3, but may be of an upright type in which the vehicle body side tube 3 is inserted into the axle side tube 4.

Subsequently, the cap C is attached to the upper end of the vehicle body side tube 3 in FIG. 2, which is the vehicle body side end of the fork main body 2, and the opening of the upper end of the vehicle body side tube 3 is closed by the cap C. Furthermore, a lower end of the axle side tube 4 in FIG. 1, which is a lower end of the fork main body 2, is closed by a bracket 30 on the axle side. Moreover, a tubular gap formed in the portion in which the vehicle body side tube 3 and the axle side tube 4 overlap with each other is closed by an annular sealing member 20 attached to a lower end of the vehicle body side tube 3 and in sliding contact with an outer circumference of the axle side tube 4.

In this manner, the inside of the fork main body 2 is a sealed space, and a damper D is accommodated in the fork main body 2. The damper D includes the cylinder 6 accommodated in the axle side tube 4, a piston 21 slidably inserted into the cylinder 6, and the piston rod 7 having a lower end connected to the piston 21 and an upper end protruding outside the cylinder 6 and connected via the cap C.

As described above, the piston rod 7 is connected to the vehicle body side tube 3 via the cap C, and the cylinder 6 is connected to the axle side tube 4. As described above, the damper D is provided between the vehicle body side tube 3 and the axle side tube 4, and the piston rod 7 relatively moves in an axial direction with respect to the cylinder 6 to extend and contract as the fork main body 2 extends and contracts.

In the present embodiment, the piston rod 7 includes a tubular piston holding rod 7a as a small-diameter rod connected to the piston 21 and a tubular connector accommodation rod 7b as a large-diameter rod screwed to the upper end of the piston holding rod 7a, and is connected to the lower end of the cap C by a connection nut 27.

The piston holding rod 7a includes a threaded portion 7a1 provided on the outer circumference of the upper end in FIG. 1 and a seal ring 7a2 attached to the outer circumference in close proximity to the threaded portion 7a1, and the lower end in FIG. 1 is connected to the piston 21.

In addition, the connector accommodation rod 7b has a larger diameter than the piston holding rod 7a, and includes a threaded portion 7b1 on the inner circumference of the lower end in FIG. 1. Then, by screwing the threaded portion 7a1 at the upper end of the piston holding rod 7a and the threaded portion 7b1 on the inner circumference of the lower end of the connector accommodation rod 7b in FIG. 1, the piston holding rod 7a and the connector accommodation rod 7b are connected by screw fastening. The piston holding rod 7a and the connector accommodation rod 7b connected in this manner are sealed by the seal ring 7a2 described above. Note that the piston holding rod 7a and the connector accommodation rod 7b may be configured as an integral component.

Furthermore, the connector accommodation rod 7b includes a flange 7b2 on the outer circumference of the upper end in FIG. 1. In addition, an annular stopper 28 is attached to the outer circumference of the connector accommodation rod 7b on the side of the cylinder 6 with respect to the flange 7b2 at a position spaced apart in the axial direction.

The connection nut 27 includes a nut portion 27a having an annular shape and having a thread groove on the inner circumference, and an annular extension portion 27b continuous with a cylinder-side end of the nut portion 27a in the axial direction. The inner diameter of the nut portion 27a is larger than the outer diameter of the flange 7b2, but the inner diameter of the extension portion 27b is set to be smaller than the outer diameter of the flange 7b2 and slightly larger than the outer diameter of the connector accommodation rod 7b.

Therefore, the connection nut 27 includes a step portion 27c in which the inner diameter on the upper side in FIG. 1 is enlarged in the middle and which faces the lower surface in FIG. 1 of the flange 7b2 of the connector accommodation rod 7b. Then, when the connector accommodation rod 7b with the flange 7b2 side facing upward is inserted from above the connection nut 27 into the inner circumference of the connection nut 27 with the nut portion 27a side facing upward, the connection nut 27 is fitted to the outer circumference of the connector accommodation rod 7b so as to be movable in the axial direction. Thereafter, the stopper 28 is attached and fixed to the outer circumference of the connector accommodation rod 7b at a position spaced apart from the flange 7b2 by at least the axial length of the extension portion 27b.

In a state of being loosely fitted to the outer circumference of the connector accommodation rod 7b, the extension portion 27b of the connection nut 27 causes the step portion 27c to face the flange 7b2 in the axial direction, and causes the cylinder-side end to face the stopper 28 in the axial direction. Therefore, when the step portion 27c abuts on the flange 7b2, the extension portion 27b is restricted from moving toward the counter-cylinder side, and when the lower end in FIG. 1 abuts on the stopper 28, the extension portion 27b is restricted from moving toward the cylinder. Therefore, the connection nut 27 is movable in the axial direction within a range between the flange 7b2 and the stopper 28, but does not fall off from the connector accommodation rod 7b. The outer circumference of the extension portion 27b has a hexagonal cross-sectional shape in the present embodiment. Therefore, the user can easily rotate the connection nut 27 by gripping the extension portion 27b with a tool such as a wrench not illustrated. On the outer circumference of the stopper 28, for example, an annular groove 28a is formed as an attachment portion that enables attachment of a C-shaped tool not illustrated.

Then, the cylinder 6 has a tubular shape, and a rod guide 22 having an annular upper end in FIG. 1 is attached to the cylinder 6. A piston holding rod 7a of the piston rod 7 is inserted inside the rod guide 22 so as to be movable in the axial direction. The rod guide 22 slidably supports the piston rod 7 and guides the movement of the piston rod 7 in the vertical direction in FIG. 1.

A liquid chamber L filled with a liquid such as a hydraulic oil is formed in the cylinder 6, and the liquid chamber L is partitioned into an extension side chamber R1 and a compression side chamber R2 by the piston 21. The extension side chamber R1 herein is a chamber that is compressed by the piston 21 when the damper D extends, among the two chambers partitioned by the piston. On the other hand, the compression side chamber R2 is a chamber that is compressed by the piston 21 when the damper D contracts, among the two chambers partitioned by the piston 21. The piston 21 is connected to the lower end of the piston holding rod 7a of the piston rod 7.

As described above, the damper D in the front fork 1 according to the present embodiment is of a single rod type, and the piston rod 7 extends outside the cylinder 6 from one side of the piston 21. However, the damper D may also be of a double rod type, and piston rods may extend outside the cylinder from opposite sides of the piston.

Furthermore, a space outside the cylinder 6, more specifically, a space between the damper D and the fork main body 2, is a liquid storage chamber R. In the liquid storage chamber R, the same liquid as the liquid in the cylinder 6 is stored, and a gas chamber G filled with a gas such as air is formed above a liquid level. In this manner, the fork main body 2 functions as an outer shell of a tank that stores a liquid separately from the liquid in the cylinder 6.

Note that although not illustrated, the liquid storage chamber R communicates with the compression side chamber R2, and a damping valve that gives resistance to a flow of the liquid flowing from the compression side chamber R2 toward the liquid storage chamber R and a check valve that allows only a flow of the liquid flowing from the liquid storage chamber R toward the compression side chamber R2 are provided.

Furthermore, the piston 21 is provided with a damping passage 21a that interconnects the extension side chamber R1 and the compression side chamber R2, and a solenoid valve SV that gives resistance to a flow of the liquid passing through the damping passage 21a. The solenoid valve SV includes a solenoid 8 as an electric device and a valve body 25 driven by the solenoid 8.

In the front fork 1 according to the present embodiment, although not illustrated in detail, the solenoid 8 includes, for example, a winding, a fixed iron core, a movable iron core inserted into the winding so as to be movable in the axial direction, and a spring that biases the movable iron core, and the movable iron core is attracted toward the fixed iron core by supplying power to the winding to apply thrust to the movable iron core. Then, the solenoid 8 transmits the thrust applied to the movable iron core to the valve body 25, and can adjust the thrust applied to the valve body 25 by adjusting the current flowing through the winding. Therefore, the solenoid valve SV can adjust the resistance given to the flow of the liquid passing through the damping passage 21a in accordance with an amount of power supplied to the solenoid 8. The solenoid valve SV may be a variable relief valve capable of adjusting a valve opening pressure, or may be a spool valve capable of adjusting an opening degree of the damping passage 21a. Note that the damping passage 21a may be provided with an orifice or a damping valve in series or in parallel with the solenoid valve SV.

The solenoid 8 as an electric device in the solenoid valve SV is configured to receive power supply from an external power supply (not illustrated) through the wire 9 accommodated in the piston rod 7. The wire 9 includes an inner cable 9a connected to the winding, not illustrated, of the solenoid 8 and inserted into the piston rod 7, and an outer cable 9b connected to the inner cable 9a via a connector 9c, held by the cap C, and pulled out from the fork main body 2.

The outer cable 9b includes a coupler 9b1 having one end connected to the inner cable 9a via the connector 9c and the other end enabling connection to a wire connected to an external power supply which is not illustrated. Therefore, when the coupler 9b1 is connected to a wire, which is not illustrated, on the external power supply side, the winding of the solenoid 8 can be energized through the wire 9.

The connector 9c includes a plug 9c1 provided therein with a pin, not illustrated, electrically connected to the outer cable 9b, and a receptacle 9c2 provided therein with a contact, not illustrated, electrically connected to the winding of the solenoid 8 via the inner cable 9a. Then, when the plug 9c1 is inserted into the receptacle 9c2, the connector 9c maintains a state in which the pin is inserted into the contact, and electrically connects the inner cable 9a and the outer cable 9b. When the plug 9c1 is removed from the receptacle 9c2, the contact between the pin and the contact is broken, and the inner cable 9a and the outer cable 9b are electrically disconnected from each other. Note that the outer cable 9b may be connected to the receptacle 9c2, and the inner cable 9a may be connected to the plug 9c1.

The maximum width of the connector 9c is smaller than the inner diameter of the connector accommodation rod 7b of the piston rod 7, and the connector 9c can be accommodated in the connector accommodation rod 7b and can be taken in and out of the connector accommodation rod 7b from above the connector accommodation rod 7b.

Furthermore, the inner cable 9a has an extra length so that the connector 9c can be taken out from an upper end of the connector accommodation rod 7b, and is accommodated in the connector accommodation rod 7b in a loosened state in a case where the connector 9c is in the connector accommodation rod 7b.

When the fork main body 2 extends and the damper D extends, the piston 21 moves upward with respect to the cylinder 6 in FIG. 1, a space of the extension side chamber R1 is reduced and a space of the compression side chamber R2 is enlarged, and the liquid in the compressed extension side chamber R1 passes through the damping passage 21a of the piston 21 and moves to the enlarged compression side chamber R2. Since the solenoid valve SV gives resistance to the flow of the liquid, the pressure in the extension side chamber R1 increases, and the damper D generates the damping force that hinders the extension of the fork main body 2. Note that at the time of the extension of the damper D, the piston rod 7 is retracted from the inside of the cylinder 6, and an amount of the liquid as the piston rod 7 is retracted is insufficient in the cylinder 6. Therefore, the insufficient amount of the liquid is supplied into the cylinder 6 from the liquid storage chamber R through the check valve.

Conversely, when the fork main body 2 contracts and the damper D contracts, the piston 21 moves downward with respect to the cylinder 6 in FIG. 1, a space of the compression side chamber R2 is reduced and a space of the extension side chamber R1 is enlarged, and the liquid in the compressed compression side chamber R2 passes through the damping passage 21a of the piston 21 and moves to the enlarged extension side chamber R1. Furthermore, at the time of the contraction of the damper D, the piston rod 7 enters the cylinder 6, and an amount of the liquid as the piston rod 7 enters is excessive in the cylinder 6. Therefore, the excessive amount of the liquid is discharged to the liquid storage chamber R from the compression side chamber R2 through the damping valve. Since the solenoid valve SV gives resistance to the flow of the liquid toward the extension side chamber R1, and the damping valve gives resistance to the flow of the liquid toward the liquid storage chamber R, the pressure in the compression side chamber R2 increases, and the damper D generates the damping force that hinders the contraction of the fork main body 2.

Here, since the solenoid valve SV can adjust the resistance given to the flow of the liquid by adjusting a current supplied to the solenoid 8 in solenoid valve SV, in the front fork 1 according to the present embodiment, the damping force generated by the damper D can be adjusted both at the time of the extension and at the time of the contraction.

Subsequently, in the front fork of the present embodiment, the cap C includes a cap body 5 screwed to the vehicle body side tube 3 to close the opening of the vehicle body side tube 3, and a rod adapter 13 connected to the cap body 5 and connected to the piston rod 7.

The cap body 5 includes: a lid portion 5a that has a disk shape and closes an upper end opening portion of the vehicle body side tube 3 in FIG. 2; a cylindrical portion which protrudes toward the inside of the fork main body 2 from a fork side end which is a lower end of the lid portion 5a in FIG. 2 and whose center coincides with the axial center line A; a wire hole 5c which communicates with the inside of the cylindrical portion 5b from a counter-fork main body side end which is an upper end of the lid portion 5a in FIG. 2 and in which a center of an opening on the counter-fork side end of the lid portion 5a is eccentric from an axial center line A; an adjuster hole 5d that is provided at a position eccentric from the axial center line A of the lid portion 5a and spaced apart from the wire hole 5c and penetrates the lid portion 5a along the vertical direction that is the axial direction; and an annular socket 5e rising from the outer circumferential side of the fork side end of the lid portion 5a toward the fork main body.

Figure 3:
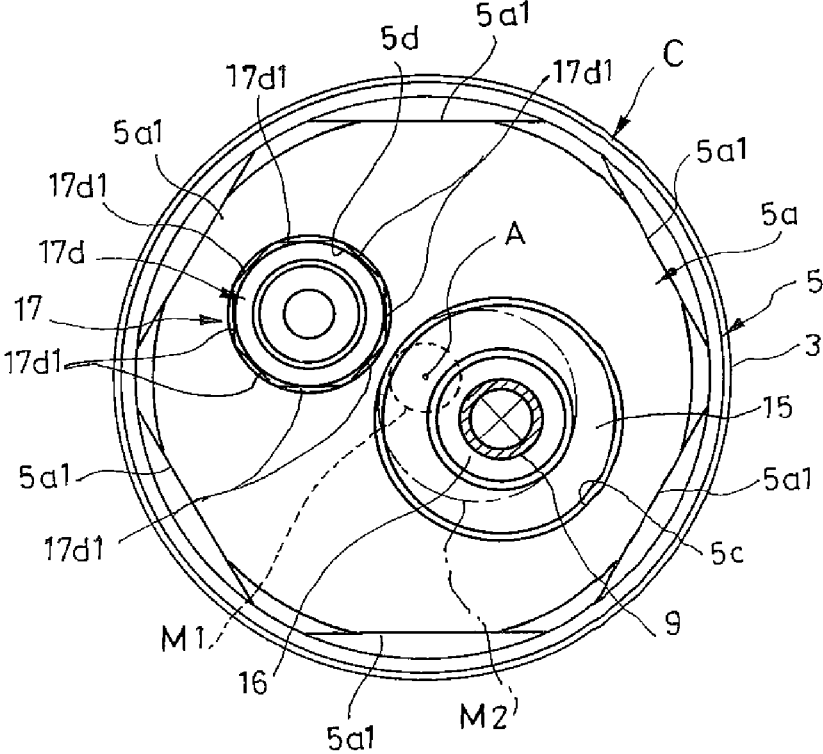
FIG. 3 is an enlarged plan view of the front fork according to an embodiment of the present invention seen in an axial direction.

The cap body 5 is screwed to the vehicle body side tube 3 by screwing a socket 5e having a threaded portion on the outer circumference thereof into a threaded portion 3a provided on the inner circumference of the upper end of the vehicle body side tube 3. When the cap body 5 is screwed to the inner circumference of the upper end of the vehicle body side tube 3, the lid portion 5a of the cap body 5 closes the upper end opening of the vehicle body side tube 3. A seal ring 26 is attached to the outer circumference of the socket 5e and on the lid portion 5a side with respect to the threaded portion 5e1, and the seal ring 26 seals between the cap body 5 and the vehicle body side tube 3. As shown in FIG. 3, notches Sa1 are provided at equal intervals in the circumferential direction at six locations on the outer circumference of the lid portion 5a so that the cap body 5 can be gripped by a tool, which is not illustrated, when the cap body 5 is screwed into the vehicle body side tube 3. A threaded portion 5e2 is also provided on the inner circumference of the socket 5e.

The cylindrical portion 5b is a cylinder centered on the center of the lid portion 5a which coincides with the axial center line A of the fork main body 2, and is provided so as to protrude toward the fork main body from the fork main body side end which is the lower end of the lid portion 5a in FIG. 2.

As illustrated in FIGS. 2 and 3, the wire hole 5c penetrates the lid portion 5a along the vertical direction in FIG. 2, which is the axial direction, and communicates with the inside of the cylindrical portion 5b. Specifically, the wire hole 5c is formed of a large-diameter hole portion 5c1 having a circular cross section opened from an end portion on the counter-fork main body side with respect to the lid portion 5a, and a small-diameter hole portion 5c2 having a circular cross section opened from a bottom portion of the large-diameter hole portion 5c1, communicating with the inside of the cylindrical portion 5b, and having a smaller diameter than the large-diameter hole portion 5c1.

As shown in FIGS. 2 and 3, the large diameter hole portion 5c1 is formed to have a circular cross section, and is formed along the axial direction with respect to the lid portion 5a such that the center of the opening thereof is shifted from the axial center line A and is at an eccentric position at the counter-fork side end which is the upper end of the lid portion 5a in FIG. 2. The small diameter hole portion 5c2 is a hole having a circular cross section smaller in diameter than the large diameter hole portion 5c1, and is formed along the axial direction of the lid portion 5a so as to be continuous with the large diameter hole portion 5c1 with respect to the lid portion 5a. The center of the small-diameter hole portion 5c2 is eccentric, being shifted from the axial center line A of the lid portion 5a. In the front fork 1 of the present embodiment, when the cap body 5 is seen in the axial direction, the wire hole 5c is formed in the lid portion 5a such that a circle (a circle indicated by a one-dot chain line in FIG. 3) M2 matching the inner circumferential surface of the small-diameter hole portion 5c2 and a circle (a circle indicated by a broken line in FIG. 3) M1 matching the inner circumferential surface of the cylindrical portion 5b are accommodated in a range surrounded by a circle matching the inner circumferential surface of the large-diameter hole portion 5c1. The wire hole 5c is only required to be provided such that the center of the opening at the end of the lid portion 5a on the counter-fork main body side is disposed at a position eccentric from the axial center line A. Therefore, the wire hole 5c may be provided so as to communicate with the inside of the cylindrical portion 5b along the direction inclined with respect to the axial center line A.

Therefore, as long as the center of the opening of the wire hole 5c at the end of the lid portion 5a on the counter-fork main body side is eccentric with respect to the axial center line A, the wire hole 5c may be installed in the lid portion 5a such that the axial center line A is disposed inside the opening, or the wire hole 5c may be installed in the lid portion 5a in a positional relationship in which the axial center line A is disposed outside the opening. Although the small-diameter hole portion 5c2 may be omitted, the step portion 5c3 facing the counter-fork main body side can be provided in the middle of the wire hole 5*c* by providing the small-diameter hole portion 5*c*2. Since the small-diameter hole portion 5*c*2 is only required to allow the large-diameter hole portion 5*c*1 to communicate with the inside of the cylindrical portion the small-diameter hole portion 5*c*2 may be disposed such that only a part of the small-diameter hole portion overlaps the large-diameter hole portion 5*c*1 when the cap body 5 is seen in the axial direction. Further, the large diameter hole portion 5*c*1 and the small diameter hole portion 5*c*2 may have cross sections other than circular shapes, and the geometric center of the cross-sectional shape of the opening of the large diameter hole portion 5*c*1 may be at a position eccentric with respect to the axial center line A.

An annular guide 14 is fitted in the large-diameter hole portion 5*c*1 of the wire hole 5*c*. The guide 14 includes an inner circumferential seal ring 14*a* accommodated in an annular groove provided along the circumferential direction on the inner circumference, an outer circumferential seal ring 14*b* accommodated in an annular groove provided along the circumferential direction on the outer circumference, and a tapered portion 14*c* increasing in diameter toward the fork main body on the fork main body side which is the inner circumference and on the lower side of the inner circumferential seal ring 14*a* in FIG. 2.

Since the guide 14 is fitted in the wire hole 5*c* whose center is eccentric from the axial center line A, the center is also arranged at a position eccentric from the axial center line A with respect to the lid portion 5*a*.

In this manner, the annular seal holder 15 is press-fitted into the large-diameter hole portion 5*c*1 and on the upper side in FIG. 2, which is the counter-fork main body side of the guide 14. The inner diameter of the seal holder 15 on the guide side is increased so that the outer circumference of the annular packing 16 inserted on the inner circumferential side can be gripped together with the guide 14.

In this manner, the outer cable 9*b* of the wire 9 is inserted into the guide 14 fixed in the wire hole 5*c* of the cap body 5 and the inner circumferential side of the packing 16. The outer circumference of the wire 9 is sealed by the packing 16 held by the inner circumferential seal ring 14*a* of the inner circumference of the guide 14 and the seal holder 15. A gap between the guide 14 and the cap body 5 is sealed by the outer circumferential seal ring 14*b* on the outer circumference of the guide 14.

The guide 14 not only holds the wire 9, holds the inner circumferential seal ring 14*a* and the outer circumferential seal ring 14*b*, and positions the wire 9 with respect to the cap body 5, but also plays a role of bearing a load in the axial direction due to press-fitting of the seal holder 15, and exhibits many functions.

The outer cable 9*b* extends downward in FIG. 2 through the small-diameter hole portion 5*c*2 and the cylindrical portion 5*b*. The outer cable 9*b* of the wire 9 comes out from the upper end in the cylindrical portion 5*b* whose center coincides with the axial center line A, and is drawn outward through the wire hole 5*c* whose center is eccentric from the axial center line A. Therefore, the wire 9 is drawn outward from a position eccentric from the axial center line A of the fork main body 2 with respect to the cap body 5.

Since the outer cable 9*b* of the wire 9 is bent where the wire 9 comes out from the upper end of the cylindrical portion 5*b* and inserted into the guide 14, even if a force acts on the outer cable 9*b* in the direction of pulling out the outer cable 9*b* to the outside of the fork main body, the portion (bent portion) 9*b*2 where the outer cable 9*b* exerts friction and the wire 9 is not easily pulled out.

Further, an annular stopper ring 9*d* facing the fork main body side end, which is the lower end in FIG. 2, of the cylindrical portion 5*b* is provided around the outer circumference of the outer cable 9*b* and outside the lower end of the cylindrical portion 5*b*. Therefore, even when a large force acts on the outer cable 9*b* in the direction of pulling out the outer cable 9*b* from the fork main body, the stopper ring 9*d* abuts on the lower end of the cylindrical portion 5*b* in FIG. 2, and further displacement of the outer cable 9*b* in the pull-out direction is restricted, so that the wire 9 is prevented from being pulled out from the fork main body. Note that the stopper ring 9*d* is only required to be one that cannot pass through the cylindrical portion 5*b* when attached to the outer circumference of the outer cable 9*b*, and if the stopper ring 9*d* can be attached after the outer cable 9*b* is attached to the cap body 5, the outer cable 9*b* can be easily attached to the cap body 5, and thus, for example, a binding band or the like may be used.

In addition, since the inner circumference of the guide 14 includes the tapered portion 14*c* whose diameter increases toward the fork main body side, the outer cable 9*b* is bent following the surface of the tapered portion 14*c*, so that an excessive load is less likely to be applied to the bent portion 9*b*2 of the outer cable 9*b*, and when a force in the pull-out direction is applied to the wire 9, the bent portion 9*b*2 can be supported by the circumferential surface of the tapered portion 14*c*, and the bent portion 9*b*2 can be protected.

The adjuster hole 5*d* provided in the lid portion 5*a* is provided at a position eccentric from the axial center line A and spaced apart from the wire hole 5*c*, and penetrates the lid portion 5*a* along the vertical direction that is the axial direction. The adjuster hole 5*d* is a hole having a circular cross section, and an inner diameter on the counter-fork main body side, which is an upper end in FIG. 2, is smaller than the lower side in FIG. 2.

The rod adapter 13 constituting the cap C together with the cap body 5 and connected to the piston rod 7 includes an outer tube 13*a* screwed to the inner circumference of the socket 5*e* of the cap body 5, a connection tube 13*b* connected to the upper end of the piston rod 7 in FIG. 2, and a pair of arm portions 13*c*, 13*c* connecting the outer tube 13*a* and the connection tube 13*b* and provided with a phase difference of 180 degrees in the circumferential direction.

The outer tube 13*a* includes a threaded portion 13*a*1 screwed to the threaded portion 5*e*2 on the inner circumference of the socket 5*e* on the outer circumference at the upper end in FIG. 2. In addition, the connection tube 13*b* includes a threaded portion 13*b*1 to which the connection nut 27 of the piston rod 7 is screwed on the outer circumference of the lower end in FIG. 2. The upper end in FIG. 2 of the connector accommodation rod 7*b* in the piston rod 7 is inserted into the lower end of the connection tube 13*b*, and the connection nut 27 fitted to the outer circumference of the connector accommodation rod 7*b* is screwed to the threaded portion 13*b*1 of the connection tube 13*b*. Then, when the connection nut 27 is screwed and tightened into the connection tube 13*b*, the flange 7*b*2 provided on the outer circumference of the connector accommodation rod 7*b* is strongly sandwiched between the step portion 27*c* on the inner circumference of the connection nut 27 and the lower end of the connection tube 13*b* in FIG. 2, whereby the piston rod 7 and the rod adapter 13 are coupled.

Further, since the outer tube 13*a* and the connection tube 13*b* are not connected over the entire circumference but are connected by the arm portions 13*c*, 13*c* provided at intervals in the circumferential direction, two arc-shaped through holes 13d, 13d are formed between the outer tube 13a and the connection tube 13b.

When the threaded portion 13a1 and the threaded portion 5e2 are screwed together while the outer tube 13a of the rod adapter 13 configured as described above is inserted into the socket 5e of the cap body 5, the rod adapter 13 is connected to the cap body 5, and the tip of the cylindrical portion 5b of the cap body 5 is inserted into and fitted to the inner circumference of the connection tube 13b on the upper end side in FIG. 2.

As illustrated in FIG. 1, a gap between the cylindrical portion 5b and the connection tube 13b is sealed by a seal ring 31 mounted on an inner circumference of the connection tube 13b of the rod adapter 13, and a gap between the piston holding rod 7a and the connector accommodation rod 7b is sealed by a seal ring 7a2. The outer circumference of the wire 9 is sealed by the packing 16 and the inner circumferential seal ring 14a, and the space between the guide 14 and the cap body 5 is sealed by the outer circumferential seal ring 14b. Therefore, the space formed in the piston rod 7, the cylindrical portion 5b of the cap body 5, and the wire hole 5c is isolated from the outside, and entry of liquid from the inside of the liquid storage chamber R into the space and entry of water, dust, and the like from the outside of the front fork are prevented, and the wire 9 accommodated in the space is protected.

Subsequently, the adjuster 11 includes an operation portion 17 inserted into the adjuster hole 5d of the cap body 5, a plate 18 that moves in the vertical direction by the operation of the operation portion 17, and a movable element 19 that is stacked on the plate 18 and fitted to the spring seat 12. The adjuster 11 can displace the movable element 19 along the axial center line A of the fork main body 2 with respect to the cap body 5 together with the spring seat 12 by operating the operation portion 17.

The spring seat 12 is movable in the vertical direction in FIG. 1 with respect to the cap body 5, and supports the upper end in FIG. 1 of the suspension spring 10 constituted of a coil spring interposed between the spring seat 12 and the rod guide 22. The suspension spring 10 exerts resilient force for separating the vehicle body side tube 3 and the axle side tube 4 from each other to bias the fork main body 2 in an extending direction. Therefore, the front fork 1 elastically supports the vehicle body when interposed between the front wheel and the vehicle body of the straddle vehicle which is described above and not illustrated.

Further, the spring seat 12 is movable in a direction along the axial center line A of the fork main body 2 which is the vertical direction in FIG. 1 with respect to the cap body 5, and the support position of the upper end in FIG. 1 of the suspension spring 10 is changed by the operation of the adjuster 11. Therefore, in the front fork 1, the spring seat 12 can be displaced in the vertical direction by the operation of the adjuster 11 to change the support position of the upper end of the suspension spring 10, and the vehicle height of the straddled vehicle can be adjusted.

Hereinafter, the adjuster 11 will be described in detail. As shown in FIG. 2, the operation portion 17 includes a screw shaft 17a, a flange 17b provided at an upper end of the screw shaft 17a in FIG. 2, a shaft portion 17c rising from an axial center of the flange 17b, and an annular operation knob 17d attached to an outer circumference of the shaft portion 17c, and is accommodated in the adjuster hole 5d of the lid portion 5a so as to be rotatable in a circumferential direction except for the shaft portion 17c and the operation knob 17d.

A seal ring 17e is attached to the outer circumference of the flange 17b, and a space between the operation portion 17 and the lid portion 5a is sealed, so that leakage of liquid from the inside of the liquid storage chamber R to the outside of the fork main body 2 is prevented.

The screw shaft 17a, the flange 17b, and the shaft portion 17c are configured as one component, and the outer circumferential shape of the shaft portion 17c and the inner circumferential shape of the operation knob 17d are shapes other than a circle, such as a width-across shape and a hexagonal shape, and coincide with each other. Therefore, when the operation knob 17d is fitted to the outer circumference of the shaft portion 17c, the relative rotation between the shaft portion 17c and the operation knob 17d in the circumferential direction is inhibited.

As illustrated in FIG. 3, notches 17d1 are provided at six positions around the outer circumference of the operation knob 17d at equal intervals so as to be easily gripped by the wrench, and the outer shape of the operation knob 17d is larger than the adjuster hole 5d and cannot enter the adjuster hole 5d. The operation knob 17d is prevented from falling off from the shaft portion 17c by a C pin, which is not illustrated, attached to the outer circumference of the shaft portion 17c. The flange 17b is accommodated in the adjuster hole 5d, has an outer diameter larger than the inner diameter of the adjuster hole 5d on the counter-fork main body side having the minimum diameter, and sandwiches the thickness of the lid portion 5a in cooperation with the operation knob 17d. Therefore, the operation knob 17d and the flange 17b restrict movement of the operation portion 17 in the vertical direction in FIG. 2, which is the axial direction. As described above, when the operation knob 17d is rotated, the entire operation portion 17 rotates in the circumferential direction.

Figure 4:
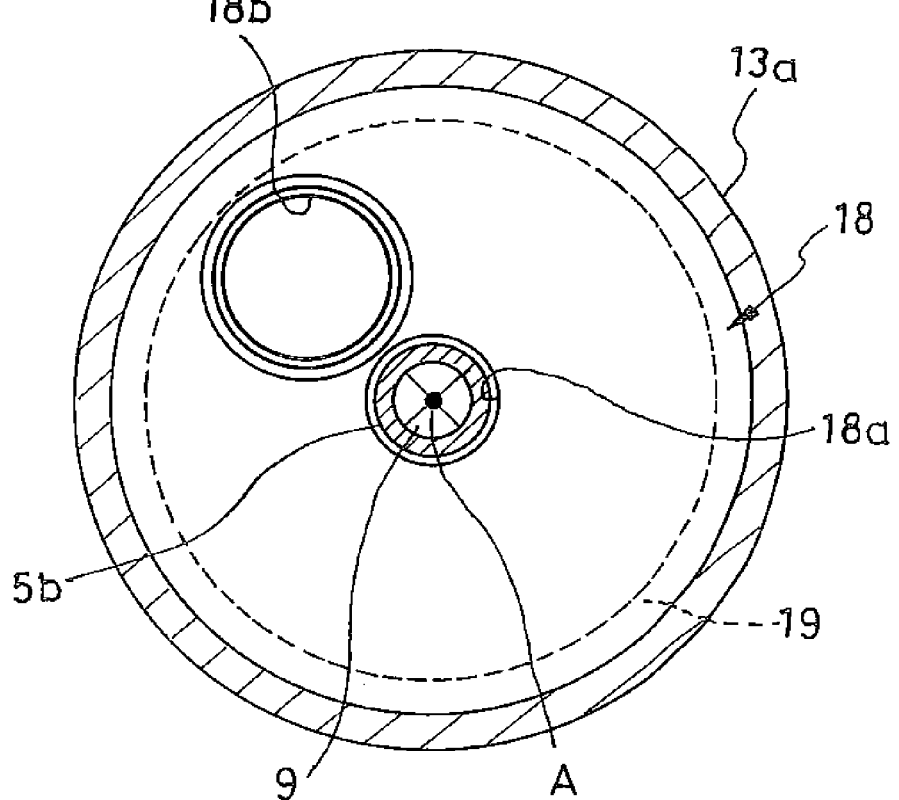
FIG. 4 is an enlarged sectional view of an adjuster portion of the front fork according to an embodiment of the present invention.

A disk-shaped plate 18 is screwed to the screw shaft 17a of the operation portion 17. As illustrated in FIG. 4, the plate 18 includes, at the center, a through hole 18a through which the cylindrical portion 5b of the cap body 5 is inserted and a screw hole 18b screwed to the outer circumference of the screw shaft 17a, and is fitted to the inner circumference of the outer tube 13a of the rod adapter 13 so as to be movable in the axial direction.

Therefore, since the plate 18 is prevented from rotating by the outer tube 13a of the rod adapter 13, when the operating portion 17 is rotationally operated, the plate 18 is displaced in the direction along the axial center line A of the fork main body 2, which is the vertical direction in FIG. 2, in the outer tube 13a of the rod adapter 13. Note that the outer shape of the plate 18 is circular, but may be a shape other than a circular shape as long as it is prevented from rotating by the rod adapter 13.

In addition, the movable element 19 includes a tubular portion 19a that abuts on the plate 18, and a pair of protruding pieces 19b, 19b rising from the fork main body side end that is the lower end of the tubular portion 19a in FIG. 2. The protruding pieces 19b, 19b have an arcuate cross section, extend downward in FIG. 2 from the tubular portion 19a in the axial direction, pass between the arm portions 13c, 13c of the rod adapter 13, and protrude outward of the rod adapter 13 through the through holes 13d, 13d.

The spring seat 12 has an annular shape, an upper diameter is larger than a lower diameter, and a step portion 12a is formed in the middle in the axial direction. The spring seat 12 supports the upper end of the suspension spring 10 in FIG. 2 at the step portion 12a, and is connected to the movable element 19 by fitting the inner circumference on the large-diameter side to the outer surface of the tip of the protruding pieces 19b, 19b of the movable element 19.

In the adjuster 11 thus configured, when the plate 18 is moved up and down by the rotation operation of the operation portion 17, the movable element 19 and the spring seat 12 connected to the movable element 19 are also displaced in the vertical direction together with the plate 18. Therefore, the support position of the suspension spring 10 of the spring seat 12 can be adjusted in the vertical direction in FIG. 1 by the rotation operation of the operation portion 17, and can be adjusted to the vehicle height of the straddle vehicle to which the front fork 1 is applied. In order to prevent the plate 18 from interfering with the lid portion 5*a* and the rod adapter 13 when the plate 18 is moved up and down within the adjustment range of the vehicle height adjustment described above, a sufficient gap that allows the plate 18 to move is provided between the lid portion 5*a* of the cap body 5 and the connection tube 13*b* of the rod adapter 13.

Figure 5:
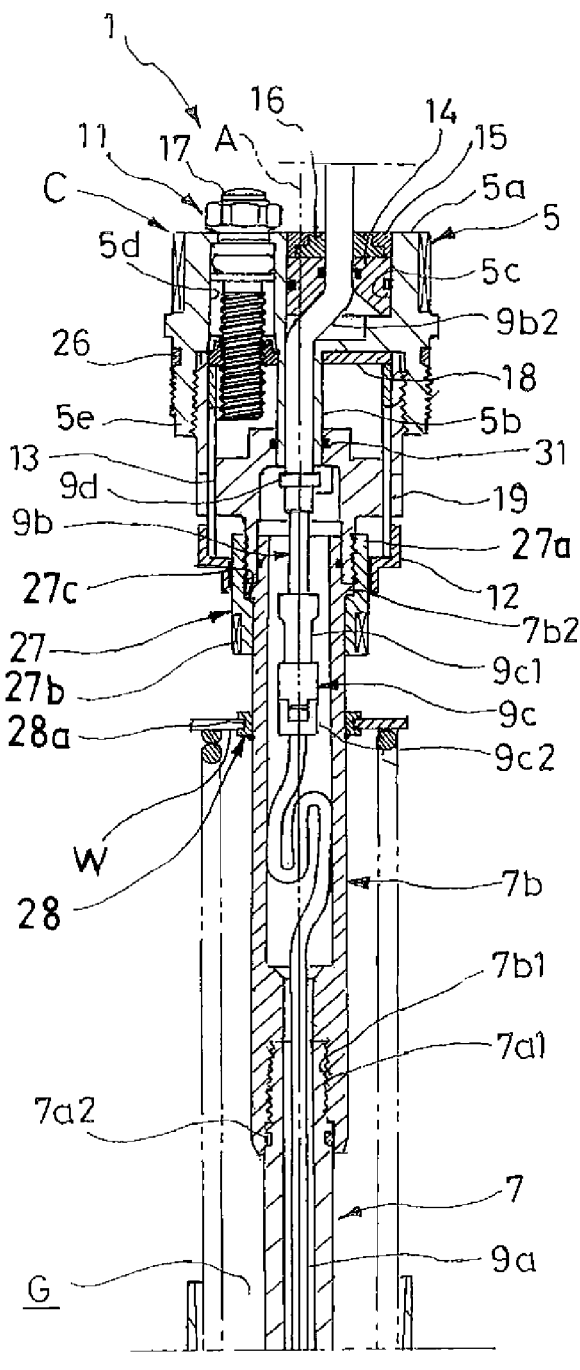
FIG. 5 is a diagram for describing a procedure of dividing a front fork according to an embodiment of the present invention.

The front fork 1 is configured as described above, and when maintenance work is performed, the cap body 5 is removed from the vehicle body side tube 3, and the vehicle body side tube 3 is slid toward the axle side tube 4 to expose the suspension spring 10 outward. Subsequently, as illustrated in FIG. 5, after the suspension spring 10 is compressed until the upper end of the suspension spring 10 is positioned below the stopper 28, the C-shaped tool W is fitted into the annular groove 28*a* of the stopper 28. Since the tool W can be fitted and attached to the annular groove 28*a* of the stopper 28 and has an outer diameter larger than the outer diameter of the suspension spring 10, the tool W supports the upper end of the suspension spring 10 instead of the spring seat 12 and maintains the suspension spring 10 in a contracted state. Note that the illustrated tool W is an example, and the tool W is only required to be attachable and detachable with respect to the stopper 28 and able to support the upper end of the suspension spring 10, and thus the shape and structure of the tool W can be appropriately changed in design.

When the upper end of the suspension spring 10 is thus supported by the tool W, the connection nut 27 is positioned above the upper end of the suspension spring 10, and the connection nut 27 can be operated from the outside without interference of the suspension spring 10. When the outer circumference of the extension portion 27*b* is gripped with a tool such as a wrench and the connection nut 27 is rotated, the connection nut 27 can be easily removed from the threaded portion 7*b*2 and the cap C can be removed from the piston rod 7.

Subsequently, the connector 9*c* is pulled out from the connector accommodation rod 7*b*, the plug 9*c*1 of the connector 9*c* is removed from the receptacle 9*c*2, the inner cable 9*a* and the outer cable 9*b* are separated, and the outer cable 9*b* is completely removed from the fork main body 2 together with the cap C. In this manner, the cap C can be completely removed from the vehicle body side tube 3 without interference of the wire 9. When the cap C is removed from the vehicle body side tube 3, the disassembly work is completed, and the upper end opening portion of the vehicle body side tube 3 is completely opened such that maintenance work such as replacement of the suspension spring 10 and the seal in the fork main body 2, and replacement or supply of the hydraulic oil in the damper D and the liquid storage chamber R can be performed.

When the cap C and the outer cable 9*b* are attached to the fork main body 2 after completion of the maintenance, the plug 9*c*1 and the receptacle 9*c*2 are connected to connect the inner cable 9*a* and the outer cable 9*b*. Subsequently, after the upper end of the connector accommodation rod 7*b* of the piston rod 7 is inserted into the connection tube 13*b* of the cap C, the connection nut 27 is screwed to the threaded portion 13*b*1 provided on the outer circumference of the connection tube 13*b*. Then, the flange 7*b*2 of the connector accommodation rod 7*b* is sandwiched between the connection nut 27 and the lower end of the connection tube 13*b*, and the piston rod 7 and the cap C are coupled. During the work of connecting the piston rod 7 and the cap C, the tool W is attached to the stopper 28 and the upper end of the suspension spring 10 is supported by the tool W.

Thereafter, when the tool W is removed, the upper end of the suspension spring 10 is supported by the spring seat 12, and then the vehicle body side tube 3 is rotated to screw the vehicle body side tube 3 to the threaded portion 5*e*1 on the outer circumference of the cap body 5, the cap C is connected to the vehicle body side tube 3, whereby the assembly of the front fork 1 is completed.

As described above, when the cap C is attached to and detached from the piston rod 7, only the connection nut 27 may be rotated without rotating the cap C and the piston rod 7. Therefore, the wire 9 attached to the cap C and inserted into the piston rod 7 does not rotate at the time of attachment and detachment of the cap C to and from the piston rod 7, and thus does not twist at all.

As described above, the front fork 1 according to the present embodiment includes: a telescopic fork main body 2 having a vehicle body side tube 3 and an axle side tube 4, the telescopic fork main body 2 being expandable and contractible; a cap C attached to a vehicle body side end of the vehicle body side tube 3; a cylinder 6 provided in the axle side tube 4; a tubular piston rod (rod) 7 that is axially movably inserted into the cylinder 6 and has one end connected to the cap body 5; a solenoid (electric device) 8 housed in the cylinder 6; and a wire 9 that is connected to the solenoid (electric device) 8, is inserted into the piston rod (rod) 7, passes through the cap C, and is drawn out from the fork main body 2, in which the cap C has a connection tube 13*b* connected to the piston rod (rod) 7, and the connection tube 13*b* and the piston rod (rod) 7 are connected by an annular connection nut 27 that is rotatably mounted at a predetermined position on an outer circumference of one of the connection tube 13*b* and the piston rod (rod) 7, and is restricted in movement in the axial direction toward the other, and screwed to an outer circumference of the other of the connection tube 13*b* and the piston rod (rod) 7.

In the front fork 1 thus configured, the connection nut 27 is attached to the outer circumference of one of the connection tube 13*b* and the piston rod (rod) 7 so as to be rotatable in the circumferential direction although the movement of the connection nut 27 toward the other is restricted, whereby, as the connection nut 27 is being screwed to the outer circumference of the other of the connection tube 13*b* and the piston rod (rod) 7, the connection tube 13*b* and the piston rod (rod) 7 are pulled and coupled without being rotated by the connection nut 27.

Therefore, in the front fork 1 thus configured, when the cap C is attached to and detached from the piston rod (rod) 7, it is only required to rotate only the connection nut 27 without rotating the cap C and the piston rod (rod) 7 in the circumferential direction. Therefore, according to the front fork 1 of the embodiment, when the cap C is attached to and detached from the piston rod (rod) 7, it is possible to prevent twisting of the wire 9 that is inserted into the cap C and the piston rod (rod) 7 and supplies power to the solenoid (electric device) 8 inside.

Note that in the front fork 1 according to the present embodiment, the connection nut 27 is mounted on the outer circumference of the piston rod (rod) 7 in a rotatable manner while movement toward the connection tube 13*b* is restricted by the flange 13*b*1, and is screwed to the threaded portion 13*b*1 on the outer circumference of the connection tube 13*b*. The connection tube 13*b* may be rotatably mounted on the outer circumference of the connection tube 13*b* in a state where movement toward the piston rod (rod) 7 side is restricted, and may be screwed to the outer circumference of the piston rod (rod) 7. The predetermined position on the outer circumference of one of the connection tube 13*b* and the piston rod 7 where the connection nut 27 is restricted from moving toward the other of the connection tube 13*b* and the piston rod (rod) 7 is set to a position where the connection nut 27 can be screwed onto the outer circumference of the other of the connection tube 13*b* and the piston rod (rod) 7. In this way, the connection nut 27 can be screwed to the outer circumference of the other of the connection tube 13*b* and the piston rod (rod) 7 while movement thereof toward the other of the connection tube 13*b* and the piston rod (rod) 7 is restricted by the outer circumference of one of the connection tube 13*b* and the piston rod (rod) 7, so that the connection tube 13*b* and the piston rod (rod) 7 can be pulled and connected to each other. In the case of the front fork 1 of the present embodiment, a flange 7*b*2 is provided on the outer circumference of the connector accommodation rod 7*b*, and when the step portion 27*c* of the connection nut 27 abuts on the flange 7*b*2, the movement toward the connection tube 13*b* is restricted, and the predetermined position is set by the installation position of the flange 7*b*2. In addition, since it is only required to restrict the movement of the connection nut 27 with respect to one of the connection tube 13*b* and the piston rod (rod) 7 toward the other of the connection tube 13*b* and the piston rod (rod) 7 at a predetermined position, in a state where the connection tube 13*b* and the piston rod (rod) 7 are not connected, the connection nut 27 may be allowed to move in a direction away from the other of the connection tube 13*b* and the piston rod (rod) 7 or may be rotatably mounted in the circumferential direction in a state of being immovable in the axial direction with respect to a predetermined position of one of the connection tube 13*b* and the piston rod (rod) 7 at a predetermined position.

In the front fork 1 of the present embodiment, the piston rod (rod) 7 has a tubular shape, and the wire 9 is drawn out of the cylinder 6 through the inside of the piston rod (rod) 7. Therefore, according to the front fork 1 of the present embodiment, the wire 9 does not interfere with the relative displacement of the piston rod (rod) 7 with respect to the cylinder 6, and the fork main body 2 can be smoothly expanded and contracted.

In the front fork 1 of the present embodiment, the connection tube 13*b* is fitted to the outer circumference of the cap side end of the piston rod (rod) 7, the piston rod (rod) 7 has the flange 7*b*2 abutting on the end portion of the connection tube 13*b*, the connection tube 13*b* has the threaded portion 13*b*1 on the outer circumference, and the connection nut 27 is screwed to the threaded portion 13*b*1 to sandwich the flange 7*b*2 with the connection tube 13*b*, thereby connecting the cap C and the piston rod (rod) 7. According to the front fork 1 thus configured, since the piston rod (rod) 7 is fitted into the connection tube 13*b*1, it is possible to obtain strength that can sufficiently withstand bending moment at the connection portion of the connection nut 27, and it is possible to improve the practicality of the front fork 1.

Figure 6:
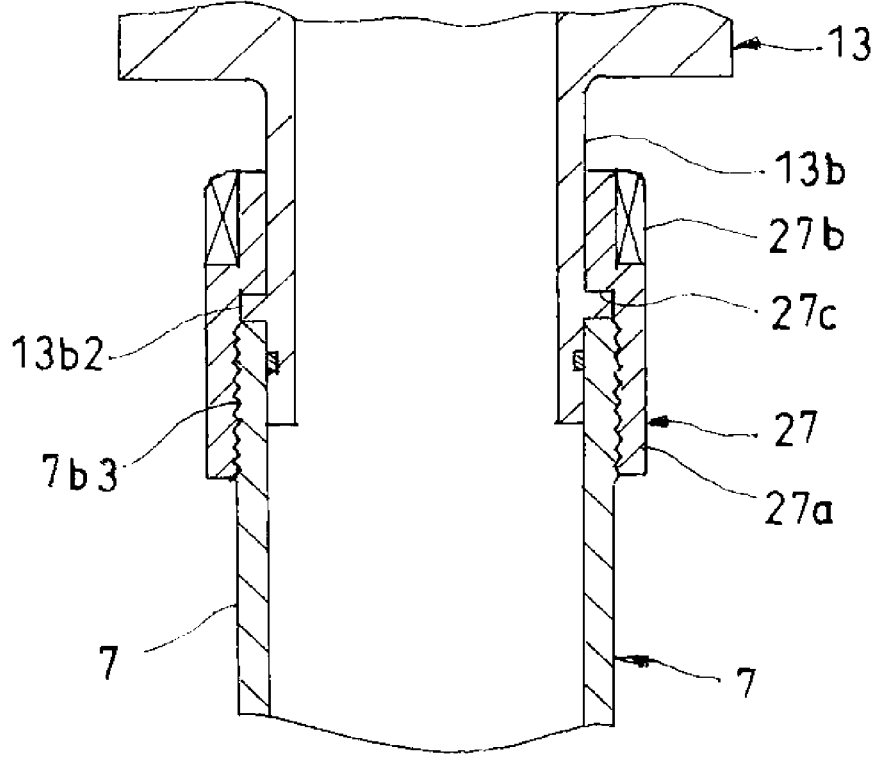
FIG. 6 is an enlarged sectional view of a connecting portion between a connection tube and a rod in a front fork according to a modification of an embodiment of the present invention.

In the above-described embodiment, the upper end of the piston rod (rod) 7 is inserted into the inner circumference of the connection tube 13*b*. However, as illustrated in FIG. 6, when the connection tube 13*b* is inserted into the inner circumference of the upper end of the piston rod (rod) 7, a flange 13*b*2 may be provided on the outer circumference of the connection tube 13*b* to attach the connection nut 27 to the outer circumference of the connection tube 13*b*, and a threaded portion 7*b*3 to which the connection nut 27 is screwed may be provided on the outer circumference of the connector accommodation rod 7*b*. That is, the connection tube 13*b* of the cap C may be fitted to the inner circumference or the outer circumference of the cap side end of the piston rod (rod), a flange may be provided on one of the connection tube 13*b* and the cap side end of the piston rod (rod) arranged on the inner circumferential side so as to abut on an end of the other, a threaded portion may be provided on the outer circumference of the other of the connection tube 13*b* and the cap side end of the piston rod (rod) arranged on the outer circumferential side, and the connection nut 27 may be screwed to the threaded portion to sandwich the flange between the connection nut 27 and the other of the connection tube 13*b* and the piston rod (rod) 7.

However, when the connection tube 13*b* is inserted into the inner circumference of the upper end of the piston rod (rod) 7, the outer diameter of the connector accommodation rod 7*b* becomes large, and the outer diameters of the suspension spring 10, the vehicle body side tube 3, and the axle side tube 4 become large. In other words, when the configuration in which the connector accommodation rod 7*b* is inserted into the inner circumference of the connection tube 13*b* is adopted as with the front fork 1 illustrated in FIGS. 1 and 2, the outer diameter of the front fork 1 can be reduced.

In the front fork 1 of the present embodiment, the connection nut 27 includes an annular nut portion 27*a* screwed to the threaded portion 13*b*1, and an annular extension portion 27*b* connected to one end of the nut portion 27*a* in the axial direction and mounted on the outer circumference of the cap side end of the piston rod (rod) 7 so as to be movable in the axial direction, and at least a part of the outer circumference of the extension portion 27*b* has a shape that enables gripping by a tool. According to the front fork 1 thus configured, the outer shape of the connection nut 27 can be reduced, and the outer diameters of the suspension spring 10, the vehicle body side tube 3, and the axle side tube 4 can also be reduced, so that the outer diameter of the front fork 1 can be reduced. When the outer circumferential shape of the nut portion 27*a* is a shape that enables gripping by the tool, the connection nut 27 may not include the extension portion 27*b* as long as it includes the nut portion 27*a* and the step portion 27*c* facing the flange 7*b*2. As described above, in a case where the outer circumferential shape of the nut portion 27*a* is formed in a shape that enables gripping by the tool, the outer shape of the nut portion 27*a* is increased in size due to the necessity of securing the thickness of the nut portion 27*a* because the connection nut 27 is screwed to the outer circumference of a member disposed on the outer circumference of the connection tube 13*b* and the piston rod (rod) 7, and as a result, the outer shape of the front fork 1 is increased in size. Therefore, it is advantageous to adopt the structure of the front fork 1 including the extension portion 27*b* that can be gripped by the tool from the viewpoint of reduction in size. Note that the outer circumferential shape of the extension portion 27*b* of the connection nut 27 may be a shape that enables gripping by the tool over the entire length in the axial direction, or only a part of the outer circumferential shape may be a shape that enables gripping by the tool. In addition, the outer circumferential shape of the extension portion 27*b* is only required to be a shape suitable for a tool used for rotating the connection nut 27, and is not limited to a hexagonal shape.

Furthermore, in the front fork 1 of the present embodiment, the piston rod (rod) 7 includes a tubular piston holding rod (small-diameter rod) 7a that goes in and out of the cylinder 6, and a connector accommodation rod (large-diameter rod) 7b having one end connected to the counter-cylinder-side end of the piston holding rod (small-diameter rod) 7a and an inner diameter larger than that of the piston holding rod (small-diameter rod) 7a, the wire 9 includes an inner cable 9a that is housed in the piston holding rod (small-diameter rod) 7a, an outer cable 9b that is housed in the connector accommodation rod (large-diameter rod) 7b, passes through the cap C, and is drawn out of the fork main body 2, and a connector 9c that is housed in the connector accommodation rod (large-diameter rod) 7b and connects the inner cable 9a and the outer cable 9b, and the other end of the connector accommodation rod (large-diameter rod) 7b is connected to the cap C by the connection nut 27.

According to the front fork 1 configured as described above, since the wire 9 can be separated into the inner cable 9a and the outer cable 9b by the connector 9c, the cap C and the outer cable 9b can be completely detached from the fork main body 2, whereby the maintenance work is facilitated, and since the bulky connector 9c is accommodated in the connector accommodation rod 7b outside the cylinder 6 and only the piston holding rod 7a having a small outer diameter is inserted into the cylinder 6, a pressure receiving area of the piston 21 can be secured without increasing the diameter of the cylinder 6, and extension side damping force can be sufficiently exerted while avoiding an increase in size of the front fork 1. In the front fork 1 of the present embodiment, since the wire 9 has a configuration in which the inner cable 9a and the outer cable 9b are connected by the connector 9c, the maintenance of the front fork 1 is facilitated. However, the wire 9 may be configured such that one end is connected to the solenoid (electric device) 8 and the other end is pulled out from the wire hole 5c of the cap body 5 without being divided in the middle.

Furthermore, the front fork 1 of the present embodiment includes the suspension spring 10 that is disposed on the outer circumference of the piston rod (rod) 7, is accommodated in the fork main body 2, and biases the fork main body 2 in the extending direction, and the stopper 28 that is provided on the outer circumference of the piston rod (rod) 7 and at a position spaced apart from the flange 7b2 toward the cylinder 6 to restrict the movement of the extension portion 27b of the connection nut 27 toward the cylinder 6, and the stopper 28 has the annular groove (attachment portion) 28a that enables attachment of the tool W capable of supporting the upper end of the suspension spring 10. According to the front fork 1 thus configured, since the upper end of the suspension spring 10 is supported by the tool W attached to the stopper 28 and is not disturbed by the suspension spring 10 at the time of the rotational operation of the connection nut 27, the attaching and detaching work of the cap C to and from the piston rod (rod) 7 can be easily performed. The tool W may be any tool that can be attached to the stopper 28 and support the upper end of the suspension spring 10 to maintain the suspension spring 10 in a contracted state. Therefore, in the front fork 1 of the present embodiment, since the tool W is a C-shaped disk, the attachment portion of the stopper 28 is the annular groove 28a so as to enable insertion and holding of the tool W. However, the attachment portion can be appropriately designed according to the shape and structure of the tool W.

The front fork 1 of the present embodiment includes the suspension spring 10 that is accommodated in the fork main body 2 and biases the fork main body 2 in the extending direction, and the adjuster 11 that can adjust the support position of the spring seat 12 that supports the suspension spring 10. The wire 9 is pulled out of the fork main body 2 from a position eccentric from the axial center line A of the fork main body 2 in the cap body 5, and the operation portion 17 of the adjuster 11 is provided at a position eccentric from the axial center line A of the fork main body 2 in the cap body 5 and separated from the wire 9. In the front fork 1 thus configured, the operation portion 17 of the adjuster 11 and the wire 9 are disposed at positions eccentric from the axial center line A of the fork main body 2 with respect to the cap body 5, and the operation portion 17 is not disposed around the outer circumference of the wire 9. Therefore, the operation portion 17 can be reduced in size regardless of the diameter of the wire 9, whereby user's operation on the operation portion 17 can be prevented from interfering with the wire 9, and relatively free arrangement of the wire 9 and the operation portion 17 on the cap body 5 is enabled. Therefore, according to the front fork 1 of the present embodiment, even when the solenoid (electric device) 8 is provided inside, the operation portion 17 of the adjuster 11 can be reduced in size and the wire 9 does not interfere with the operation of the operation portion 17, whereby the degree of freedom in design can be improved.

Furthermore, in the front fork 1 of the present embodiment, the cap body 5 includes: the disk-shaped lid portion 5a, the cylindrical portion 5b which protrudes toward the inside of the fork main body from a fork side end of the lid portion 5a and whose center coincides with the axial center line A; the wire hole 5c which communicates with the inside of the cylindrical portion 5b from a counter-fork main body side end of the lid portion and in which a center of an opening on the counter-fork side end of the lid portion 5a is eccentric from an axial center line A; and the annular guide 14 that is accommodated in the wire hole 5c and has an inner circumference through which the wire 9 is inserted, the wire 9 being inserted into the cylindrical portion 5b and the guide 14, and bent. According to the front fork 1 thus configured, since the wire 9 is positioned with respect to the cap body 5 using the guide 14 in the wire hole 5c having an opening larger than the wire 9, the insertion of the wire 9 into the wire hole 5c is facilitated, and the wire 9 is bent by the guide 14 and the cylindrical portion Therefore, even if a force of pulling out the wire 9 from the cap body 5 is applied to the wire 9, the bent portion 9b2 of the wire 9 exerts friction, and the pulling out of the wire 9 from the cap body 5 can be inhibited. Furthermore, by using the guide 14, the arrangement of the wire 9 at the counter-fork main body side end of the cap body 5 can be easily positioned at a position eccentric from the axial center line A, and the wire 9 can be bent. Furthermore, since the center of the cylindrical portion 5b coincides with the axial center line A, when the wire 9 is pulled out of the cylinder 6 through the piston rod (rod) 7, the wire 9 is easily inserted into the cylindrical portion 5b, and the assembly work of the front fork 1 is facilitated.

If the opening of the wire hole 5c on the counter-fork main body side is eccentric from the axial center line A with respect to the cap body 5, the guide 14 can be omitted. In the front fork 1 of the present embodiment, the wire hole 5c is continuous in the cylindrical portion 5b in the axial direction. That is, when the cap body 5 is seen in the axial direction, the wire hole 5c is formed in the lid portion 5a such that a circle matching the inner circumferential surface of the small-diameter hole portion 5c2 and a circle matching the inner circumferential surface of the cylindrical portion 5*b* are accommodated in a range surrounded by a circle matching the inner circumferential surface of the large-diameter hole portion 5*c*1. When the wire hole 5*c* is continuous in the cylindrical portion 5*b* in the axial direction as described above, it is not necessary to bend the wire 9 when inserting the wire 9 into the wire hole 5*c* of the cap body 5 and the cylindrical portion 5*b*, so that the work of attaching the wire 9 to the cap body 5 is facilitated.

The front fork 1 of the present embodiment includes the outer circumferential seal ring 14*b* that seals a gap between the outer circumference of the guide 14 and the cap body 5, and the annular packing 16 that is overlaid on the guide 14 and seals a gap between the guide 14 and the wire 9. As described above, even when the wire 9 is pulled out from the wire hole 5*c* of the cap body 5 to the outside, the gap between the wire 9 and the cap body 5 is sealed, whereby water, dust, and the like can be prevented from entering the fork main body 2. An annular groove may be provided on the inner wall of the wire hole 5*c* of the cap body 5, and the outer circumferential seal ring 14*b* may be mounted in the annular groove and held on the cap body 5.

Furthermore, the front fork 1 of the present embodiment includes the inner circumferential seal ring 14*a* that seals the inner circumference of the guide 14 and the outer circumference of the wire 9. According to the front fork 1 thus configured, since the outer circumference of the wire 9 is sealed not only by the packing 16 but also by the inner circumferential seal ring 14*a*, the inside of the fork main body 2 can be tightly sealed, and even if the straddle vehicle mounted with the front fork 1 is cleaned by the high-pressure cleaning machine, water can be effectively prevented from entering the fork main body 2.

In addition, in the front fork 1 of the present embodiment, the guide 14 includes a tapered portion 14*c* that increases in diameter toward the fork main body side on the inner circumference on the fork main body side. According to the front fork 1 thus configured, since the wire 9 is bent following the surface of the tapered portion 14*c*, an excessive load is less likely to be applied to the bent portion 9*b*2 of the wire 9, and when a force in the pull-out direction is applied to the wire 9, the bent portion 9*b*2 can be supported by the circumferential surface of the tapered portion 14*c*, and the wire 9 can be protected. In addition, in the front fork 1 of the present embodiment, since the guide 14 inevitably has a long axial length (length in the vertical direction in FIG. 2) due to the relationship in which the inner circumferential seal ring 14*a* and the outer circumferential seal ring 14*b* are provided, when the tapered portion 14*c* is not provided on the inner circumference, the angle of the bent portion 9*b*2 of the wire 9 with respect to the direction of the axial center line A increases. In other words, even if the guide 14 holds the inner circumferential seal ring 14*a* and the outer circumferential seal ring 14*b* and the axial length of the guide 14 increases, the angle of the bent portion 9*b*2 of the wire 9 can be made obtuse by providing the tapered portion 14*c* on the inner circumference of the guide 14, whereby the load on the bent portion 9*b*2 can be reduced. Note that the tapered portion 14*c* of the guide 14 can be omitted. When the angle of the bent portion 9*b*2 needs to be made obtuse, the diameter of the inner circumference of the guide 14 on the fork main body side may be made large instead of providing the tapered portion 14*c*, and the support position of the wire 9 in the guide 14 may be made as high as possible in FIG. 2.

In the front fork 1 of the present embodiment, the stopper ring 9*d* facing the fork main body side end of the cylindrical portion 5*b* is provided on the outer circumference of the wire 9. According to the front fork 1 thus configured, even when a large force acts on the wire 9 in the direction of pulling out the wire 9 from the fork main body 2, the stopper ring 9*d* abuts on the cylindrical portion 5*b*, and further displacement of the wire 9 in the pull-out direction can be restricted, so that the wire 9 can be inhibited from being pulled out from the fork main body 2.

As described above, the adjuster 11 in the front fork 1 of the present embodiment includes the operation portion 17, the plate 18 screwed to the screw shaft 17*a* of the operation portion 17, and the movable element 19 that abuts on the plate 18 and is fitted to the spring seat 12. By thus configuring the adjuster 11, the operation portion 17 can be easily arranged at a position eccentric from the axial center line A of the fork main body 2 with respect to the cap body 5 and not interfering with the wire 9. Note that the adjuster 11 is only required to be able to change the supporting position of the spring seat 12 including the operation portion and supporting the upper end of the suspension spring 10, and thus other configurations can be adopted. For example, when the operation portion 17 is screwed to the cap body 5 and moves up and down by the rotational operation, the adjuster 11 may adopt a structure in which the plate 18 is omitted and the lower end of the operation portion 17 is directly brought into contact with the upper end of the movable element 19, or a structure in which the plate 18 is omitted and a tubular locknut is screwed on the outer circumference of the screw shaft 17*a* of the operation portion 17 and the lower end of the nut is brought into contact with the movable element 19. As described above, as long as the adjuster 11 adopts a structure that does not interfere with the wire 9, the design of the adjuster 11 can be modified as appropriate.

In the case where the adjuster 11 is not provided, the cap C is not required to be constituted by a plurality of components, which are the cap body 5 and the rod adapter 13, and may be constituted by one component including a lid attachable to the open end of the vehicle body side tube 3 and a tubular connection tube extending from the lid toward the rod, which is not illustrated. Therefore, regardless of the presence or absence of the adjuster, the cap C may be formed of one component when possible, or may be formed of three or more components.

Note that in the front fork 1 of the present embodiment, the electric device is the solenoid 8, but the electric device is not limited to the solenoid 8, and the electric device may be a coil in a case where the damper D is a damper using electroviscous fluid or electromagnetic viscous fluid and the coil is used to change viscosity. Furthermore, the electric device may be a sensor or the like for detecting the pressure in the damper D or detecting the extension/contraction displacement of the fork main body 2 in addition to the electric device used for adjusting the damping force of the damper D in the front fork 1, or may be constituted of a device for adjusting the damping force and a plurality of devices which are sensors. That is, the present invention can be applied to the front fork 1 in which the electric device is accommodated in the cylinder 6. Note that as long as at least a part of the electric device is inserted into the cylinder 6 even when the electric device is displaced with respect to the cylinder 6, this meets the definition that the electric device is accommodated in the cylinder 6. In addition, the rod is not limited to the piston rod 7 that holds the piston, and may also be a rod simply entering and exiting the cylinder.

Although the preferred embodiment of the present invention has been described above in detail, modifications, variations, and changes are still possible without departing from the scope of the claims.

The invention claimed is:

1. A front fork comprising:

a telescopic fork main body having a vehicle body side tube and an axle side tube, the telescopic fork main body being expandable and contractible;

a cap attached to a vehicle body side end of the vehicle body side tube;

a cylinder provided in the axle side tube;

a tubular rod that is axially movably inserted into the cylinder and has one end connected to the cap;

an electric device housed in the cylinder; and a wire that is connected to the electric device, is inserted into the rod, passes through the cap, and is drawn out from the fork main body, wherein the cap includes a connection tube connected to the rod, and the connection tube and the rod are connected by an annular connection nut that is rotatably mounted at a predetermined position on an outer circumference of one of the connection tube and the rod, and is restricted in movement in an axial direction toward the other, and screwed to an outer circumference of the other of the connection tube and the rod.

2. The front fork according to claim 1, wherein the connection tube is fitted to an inner circumference or an outer circumference of a cap side end of the rod, one of the connection tube and the cap side end of the rod disposed on the inner circumferential side has a flange abutting on an end of the other, the other of the connection tube and the cap side end of the rod disposed on the outer circumferential side has a threaded portion on the outer circumference, and the connection nut is screwed to the threaded portion to sandwich the flange with the other of the connection tube and the cap side end of the rod disposed on the outer circumferential side to connect the cap and the rod.

3. The front fork according to claim 2, wherein the connection nut includes an annular nut portion to be screwed to the threaded portion, and an annular extension portion that is connected to one end of the nut portion in the axial direction and is attached to be movable in the axial direction on an outer circumference of one of the connection tube and a cap side end of the rod arranged on an inner circumferential side, and an outer circumferential shape of at least a part of the extension portion is a shape that enables gripping by a tool.

4. The front fork according to claim 1, wherein the rod includes a tubular small-diameter rod that enters and exits the cylinder, and a large-diameter rod having one end connected to a counter-cylinder-side end of the small-diameter rod and an inner diameter larger than that of the small-diameter rod, the wire includes an inner cable that is housed in the small-diameter rod, an outer cable that is housed in the large-diameter rod, passes through the cap, and is drawn out of the fork main body, and a connector that is housed in the large-diameter rod and connects the inner cable and the outer cable, and the other end of the large-diameter rod is connected to the cap by the connection nut.

5. The front fork according to claim 1, wherein the cap side end of the rod is fitted to an inner circumference of the connection tube.

6. The front fork according to claim 2, wherein the cap-side end of the rod is fitted to an inner circumference of the connection tube, the front fork further comprises:

a suspension spring that is arranged on an outer circumference of the rod, is housed in the fork main body, and biases the fork main body in an extending direction; and a stopper provided on the outer circumference of the rod in a position spaced apart from the flange toward the cylinder side to restrict movement of the connection nut toward the cylinder side, and the stopper includes an attachment portion that enables attachment of a tool capable of supporting an upper end of the suspension spring.

* * * * *